United States Patent
Kotama et al.

(10) Patent No.: US 6,472,061 B2
(45) Date of Patent: Oct. 29, 2002

(54) MOISTURE CONTROL CONSTRUCTION MATERIAL

(75) Inventors: Makoto Kotama; Hiroshi Fukumizu; Yukio Matsumoto; Masanari Toyama; Katsumi Yamamoto; Mitsunori Endo, all of Aichi (JP)

(73) Assignee: Inax Corporation, Aichi (JP)

( * ) Notice: Subject to any disclaimer, the term of this patent is extended or adjusted under 35 U.S.C. 154(b) by 0 days.

(21) Appl. No.: 09/832,207

(22) Filed: Apr. 11, 2001

(65) Prior Publication Data

US 2001/0018134 A1 Aug. 30, 2001

Related U.S. Application Data

(63) Continuation-in-part of application No. 09/261,962, filed on Mar. 3, 1999, now abandoned.

(30) Foreign Application Priority Data

Mar. 4, 1998 (JP) .............................................. 10-52152
Dec. 10, 1998 (JP) ............................................ 10-351606

(51) Int. Cl.[7] .............................................. B32B 18/00
(52) U.S. Cl. ........................ 428/325; 106/694; 106/718; 52/515; 501/128

(58) Field of Search .................................. 428/221, 195, 428/688, 325; 106/694, 718; 52/515; 501/128

(56) References Cited

U.S. PATENT DOCUMENTS

| 1,502,501 A | 7/1924 | Gumowski |
| 5,431,730 A | 7/1995 | Fujimasu |
| 5,750,239 A | 5/1998 | Fratello et al. |

FOREIGN PATENT DOCUMENTS

JP  09-137516 A  *  5/1997

* cited by examiner

Primary Examiner—Deborah Jones
Assistant Examiner—Tamra L. Dicus
(74) Attorney, Agent, or Firm—Staas & Halsey LLP

(57) ABSTRACT

A moisture control construction material is enhanced in decorativeness and improved in stain-resistance by glazing the surfaces thereof. The material is prepared by mixing soil material and clay, molding the mixture to a body, applying glate on the body and firing the body. The body may be performed biscuit firing before glazing. The moisture-absorbing-and-desorbing-performance thereof in each 8-hour cycle is more than 80 g/m$^2$. The body has prosity of 20–25%. More than 40% of pores of the body have a radius of less than 0.1 μm.

14 Claims, 2 Drawing Sheets

MOISTURE CONTROL CONSTRUCTION MATERIAL

CROSS REFERENCE TO RELATED APPLICATION

This is a continuation-in-part application of patent application Ser. No. 261,962 filed on Mar. 3, 1999, now abandoned.

BACKGROUND OF THE INVENTION AND RELATED ART STATEMENT

The present invention generally relates to a moisture control construction material and, more particularly, to a moisture control construction material enhanced in decorativeness and improved in stain-resistance by glazing surfaces thereof.

Japanese houses have achieved good moisture-controllability and water-vapor-resistance by employing wooden construction including mud walls. In recent years, highly-airtight-sealing of buildings has been promoted. This results in frequent use of what are called "new construction materials" developed by putting importance on moisture-controllability and water-vapor-resistance. Such "new construction materials", however, are insufficient in moisture-controllability and water-vapor-resistance characteristics, so that the following problems have arisen.

(i) Condensation occurring on the surface of such a "new construction material" impairs the comfortableness and durability of a building.

(ii) Moisture content due to the condensation results in growth of molds and mites.

To solve these problems, buildings are usually provided with an air conditioning system. Such an air conditioning system, however, requires electric power. Therefore, the use of such "new construction materials" is undesirable from the viewpoint of the costs of equipment and running costs.

Construction materials having a capability of moisture control have been developed so that humidity in a room is controlled without an air conditioning system and electric power and so that sufficient water-vapor-resistance is obtained. A kind of moisture controlling building materials are prepared by mixing materials having moisture absorbing and desorbing properties such as zeolite and diatomaceous earth and a construction material or clay, which is hardened by a setting hardener such as cement or gypsum, and by then burning a resultant mixture. A diatomaceous earth based moisture control construction material is proposed in Japanese Unexamined Patent Publication No. 4-354514 Official Gazette. A zeolite based moisture control construction material is proposed in Japanese Unexamined Patent Publication No. 3-109244 Official Gazette.

There have been provided no moisture control construction materials which are fired and are glazed at the surfaces thereof. This is because of the facts that, as a result of glazing the moisture control construction materials, the surfaces thereof are covered with glass layers of glaze and that such construction materials lose moisture control capability.

Thus, to ensure moisture control capability, glaze is not applied to the conventional moisture control construction materials. Consequently, the conventional moisture control construction materials have not been decorated by various kinds of decorating methods, so that the materials have small kinds design. The conventional construction materials lacking a glazed surface are easily stained by, for instance, handling, and stained construction materials are hard to be cleaned.

OBJECT AND SUMMARY OF THE INVENTION

Accordingly, the present invention aims at solving drawbacks of the conventional construction materials, and at providing a moisture control material enhanced in decorativeness and improved in stain-resistance by applying glaze onto the surfaces thereof.

A moisture control construction material of the present invention is a fired or burnt building material and has a feature that glaze is applied to the surface of the body of the moisture control construction material. The body has porosity of 20–50%, and more than 40% of pores of the body have a radius of less than 0.1 $\mu$m.

Glazing the surface of the moisture control construction material of the present invention enables various decorations thereof through the use of glaze and widens a range of design thereof.

Moreover, the glazed surface of the moisture control construction material of the present invention is hard to be stained with, for example, finger marks. Even if the glazed surface is stained, stains are easily removed therefrom. Thus, the surface of the moisture control construction material of the present invention is kept clean.

As a result of glazing the surface of the body of the moisture control construction material of the present invention, the surface thereof is covered with a glass layer produced from glaze. Thus, the moisture absorbing and desorbing rates thereof decrease a little. Further, the moisture absorbing and desorbing capacities thereof are almost the same to those having no glazed surface. Consequently, the moisture control functions of the construction materials of the present invention are excellent without impaired by the glazed surface.

Preferably, this glazing is performed so that the glass layer produced from glaze is formed on a region whose area is not more than 90% of the area of the surface of the body of the moisture control construction material. The maximum thickness of this glass layer is preferably less than 300 $\mu$m. After the surface of the moisture control construction material is glazed, it is preferable that the construction material has a moisture control performance which is more than 80% of that achieved before the surface thereof is glazed.

Preferably, the moisture-absorbing-and-desorbing-performance in each 8-hour cycle of the moisture control construction material is more than 80 g/m$^2$. Humidity in residential buildings may change very quickly by cooking, bathing or heating or according to a variation in temperature on each day so that the moisture control construction material requires high moisture absorbing and desorbing rates. This requirement is met by setting the moisture absorbing and desorbing rates in each 8-hour cycle as more than 80 g/m$^2$ (in the case of setting the moisture absorbing and desorbing rates in each 24-hour cycle, these rates are set as more than 140 g/m$^2$).

The moisture-absorbing-and-desorbing-performance in each 8-hour cycle is determined as follows. First, in a steady-temperature-and-humidity chamber in which relative humidity is maintained at 50%, a test sample is set so that the weight thereof is substantially constant (namely, a variation in weight thereof is less than 0.1%). Then, this test sample is quickly put into another steady-temperature-and-humidity chamber in which a relative humidity is maintained at 90%. An increase in weight (namely, an amount of absorbed moisture in gram) thereof, which is measured 8 hours later, is expressed as a value thereof per unit area (1 m$^2$). This value is determined as an amount of moisture absorbed during 8 hours.

An amount of moisture desorbed during 8 hours is obtained as follows. First, in a steady-temperature-and-humidity chamber in which a relative humidity is maintained at 90%, a test sample is set so that the weight thereof is substantially constant (namely, a variation in weight thereof is less than 0.1%). Subsequently, this test sample is quickly put into another steady-temperature-and-humidity chamber in which a relative humidity is maintained at 50%. A decrease in weight (namely, an amount of desorbed moisture in gram) thereof, which is measured 8 hours later, is expressed as a value thereof per unit area (1 m²). This value is determined as an amount of moisture desorbed during 8 hours. Then, the moisture-absorbing-and-desorbing-performance is obtained by the following equation:

(The moisture-absorbing-and-desorbing-performance in 8-hour cycle)={(the amount of moisture absorbed during 8 hours)+(the amount of moisture desorbed during 8 hours)}/2.

DESCRIPTION OF THE PREFERRED EMBODIMENTS

Hereinafter, the preferred embodiments of the present invention will be described in detail by referring to the accompanying drawings.

A moisture control construction material according to the present invention is prepared by glazing and firing a body of specific materials. The body may be fired or unfired before the surface of the body is glazed.

The body of the moisture control construction material may be prepared as follows. Moisture control raw materials, such as volcanic pumice layer materials produced at various places and called "kanumatsuchi", "ohsawado", colloidal soil, watertight soil and "misotsuchi", diatomite, acid clay, active clay, zeolite, halloysite, sepiolite, allophane, imogolite or the like are mixed with clays, such as kibushi-clay and gairome-clay, and with vitric ingredients, such as siliceous stone, pottery stone, agalmatolite and feldspar at the following compounding ratio. Then, the mixture is formed to a compact body by extrusion molding or press molding. If necessary, the obtained compact body is fired.

It should be noted that "kanuma-tsuchi" is a popular name of Kanuma pumice bed. "Kanuma" is a name of a city at Tochigi prefecture near Akagi volcano in Japan. "kanuma-tsuchi" is a volcanic product from the center crater of Akagi volcano (ca. 32 thousands years ago). It is a porous weathering pumice compound of allophane as clays, showing the lighthology of pyroxene andesite including amphibole.

The "miso-tsuchi" and "osawado" are also ones of weathering pumices at specific areas in Japan.

[Compounding Recipe (in Parts by Weight)]
Moisture control raw materials such as kanumatsuchi: 100
Clay: 100 to 1000
Vitric ingredients: 0 to 500.

Glaze is applied to the surface of the body which is either fired or unfired. It should be noted again that the body may be either unfired or performed biscuit firing before glazing on the surface thereof. The body is then fired to the glazed moisture control construction material.

Figure 2:
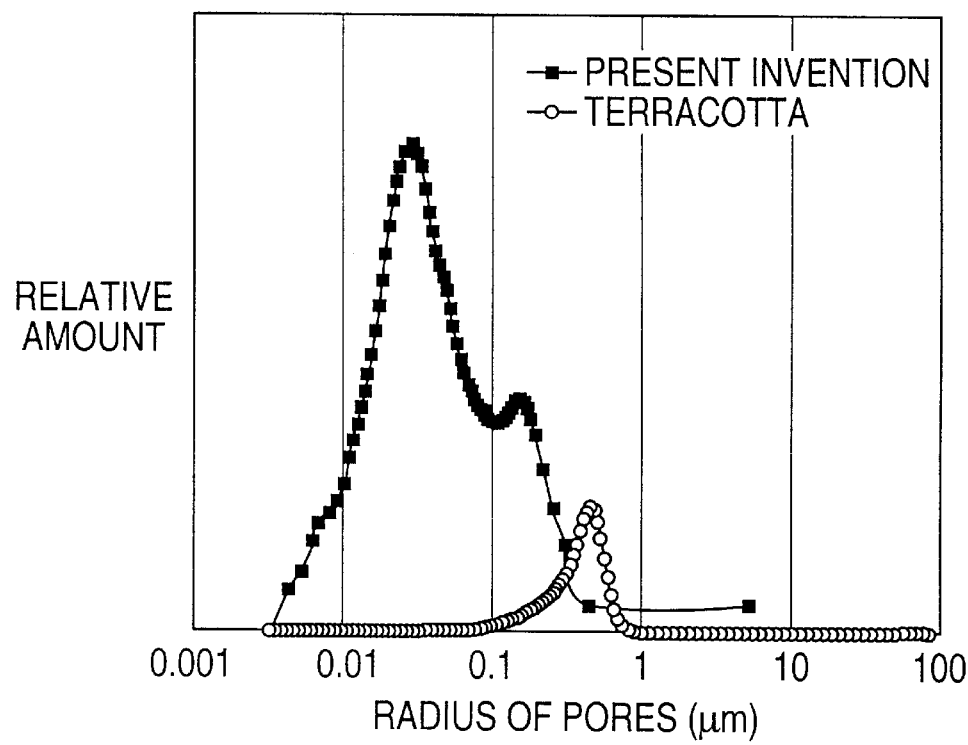
FIG. 2 is a diagram showing distribution of pores.
Figure 3:
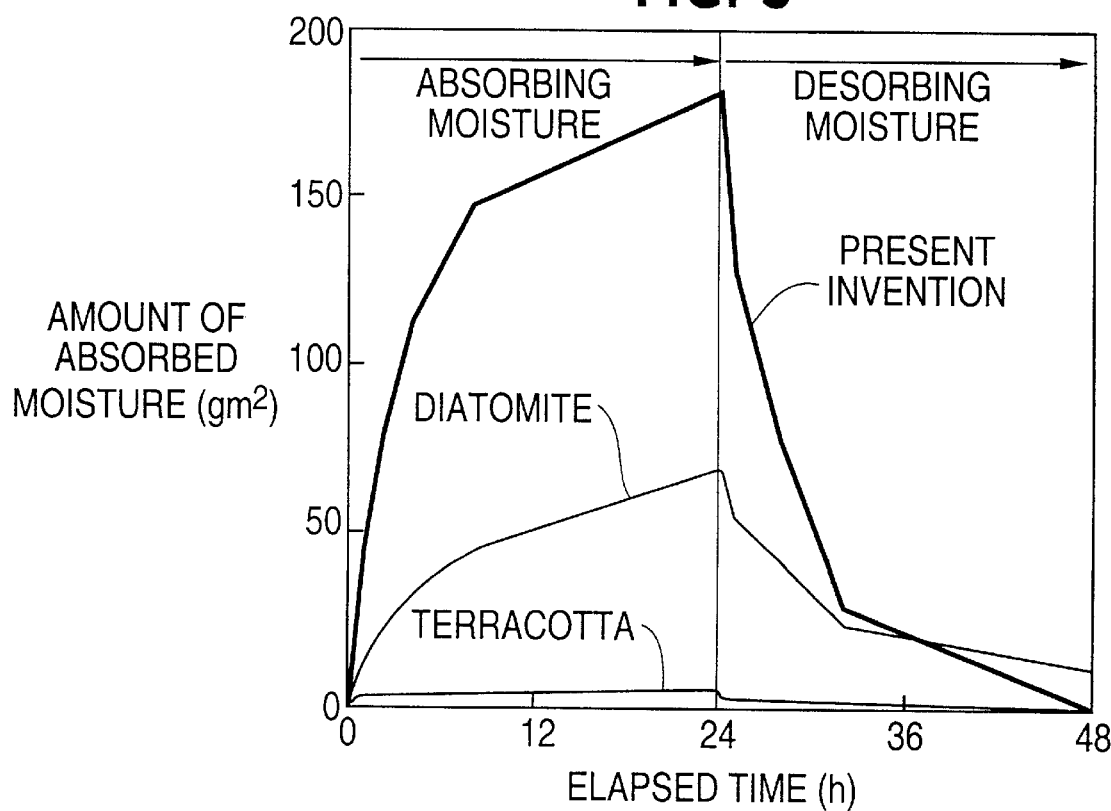
FIG. 3 is a diagram showing moisture-absorbing-and-desorbing-performance.

The body of the construction material according to the present invention has porosity of 20–50%, and more than 40% of pores of the body have a radius of less than 0.1 $\mu$m. As shown in FIG. 2, the body has very fine pores so that it has an extremely excellent property in absorbing and disorbing moisture. The construction material of the present invention absorbs and disorbs moisture in an amount of more than 2 times than diatomite, and more than 10 times than terracotta as shown in FIG. 3. The terracotta has scarcely fine pores of a radius less than 0.1 $\mu$m, so that it absorbs or disorbs moisture in a very few amount as shown in FIG. 3.

Figure 1A:
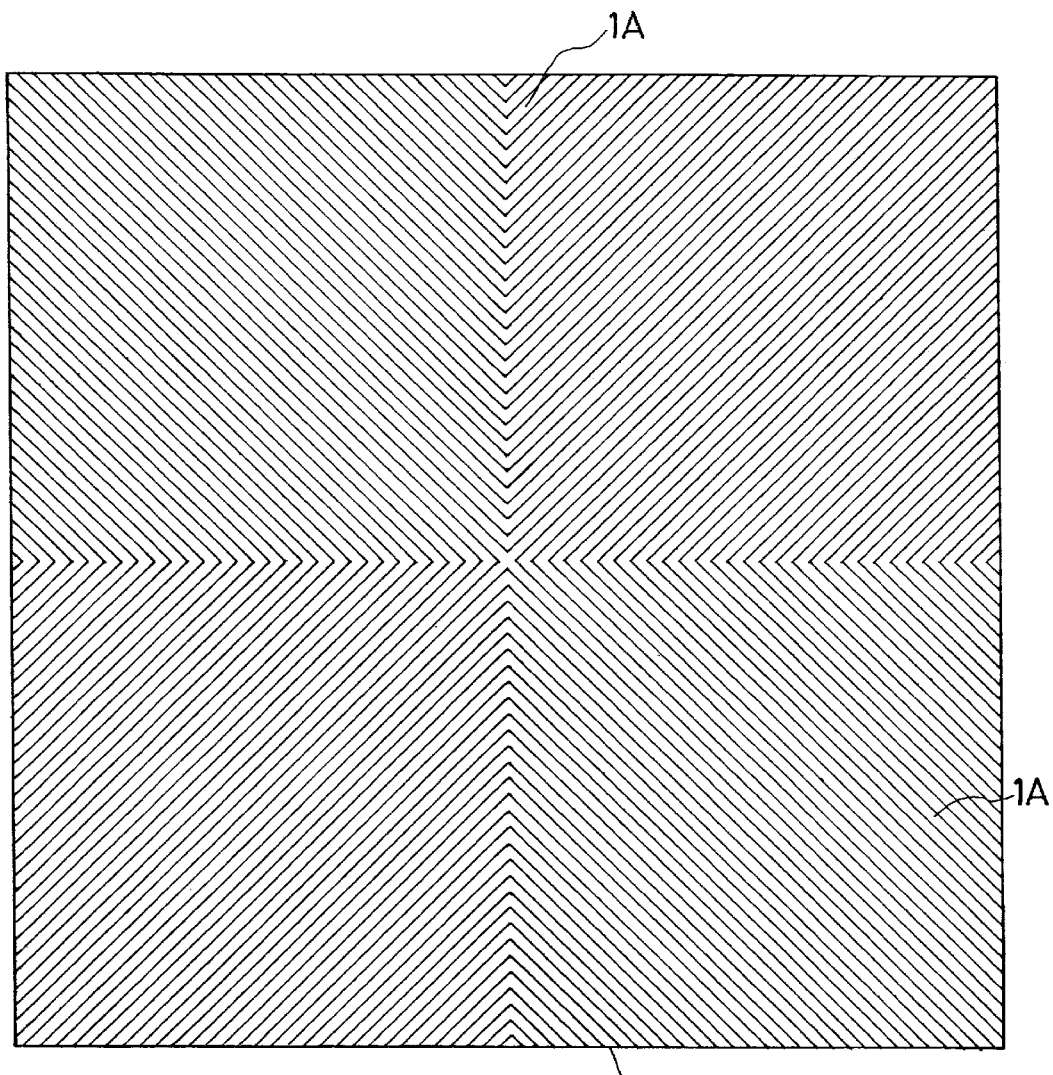
FIG. 1A is a rear view of a moisture control construction material.
Figure 1B:
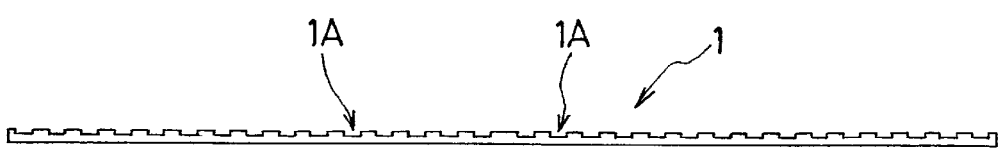
FIG. 1B is a side view of the moisture control construction material.

As shown in FIGS. 1A and 1B, grooves (or back keys) 1A may be formed in the back surface portion of the moisture control construction material. When this moisture control construction material having the grooves 1A in the back surfaces portion thereof is applied to a wall surface portion, air paths are ensured between the wall surface and the back surface of the moisture control construction material 1. Thus, the moisture control capability of this construction material is enhanced.

The moisture control construction material of the present invention has the moisture control performance at a high level, even after it is glazed and fired. Preferably, the glazed moisture control construction material has moisture control performance, which is more than 80% of that of the body before glazed. Moreover, the moisture-absorbing-and-desorbing-performance in an 8-hour cycle of the moisture control construction material is more than 80 g/m².

For glazing the body of the construction material with maintaining the moisture control performance thereof at a high level, it is important to control a glazed area proportion of the glazed surface and the thickness of a layer of glaze. Preferably, the surface of the body of the moisture control construction material is glazed so that at least one of the following conditions (a) and (b) is met. It doesn't matter what glazing method is employed. For instance, what are called "spraying method", "cascade glazing method" and "printing method" may be adopted.

(a) The ratio of the area of a glass layer, which is produced from glaze, to the area of the entire surface of the body of the moisture control construction material (hereunder referred to as a "glazed-area proportion") is less than 90%.

(b) The maximum thickness of the glass layer produced from glaze (hereunder referred to simply as the "maximum thickness") is less than 300 $\mu$m.

When the aforementioned "glazed-area proportion" exceeds 90%, the moisture control performance extremely decreases. Namely, the moisture control capability of the moisture control construction material is impaired. Conversely, when the "glazed-area proportion" is less than 10%, the glazed surface is so little that the decorativeness and stain-resistance of the construction material are not sufficiently obtained. Thus, preferably, the "glazed-area proportion" is 10 to 90%, and, more preferably, 30 to 85%.

The "glazed-area proportion" is determined by performing an ink (wiping) test, as will be described in the description of Examples.

When the "glazed-area proportion" is less than 90%, there is no limit to the "maximum thickness", but the "maximum thickness" is preferably less than 500 $\mu$m.

When the "maximum thickness" exceeds 300 $\mu$m, the moisture control performance largely decreases in the case that the "glazed-area proportion" exceeds 90%. However, when the "maximum thickness" is too small, the decorativeness and stain-resistance of the construction material are not sufficiently obtained. Consequently, the desirable "maximum thickness" is 10 to 100 μm in the case that the "glazed-area proportion" is in the range of 95 to 100%, and the desirable "maximum thickness" is 20 to 200 μm in the case that the "glazed-area proportion" is in the range of 90 to 95%.

The thin glass layer described above gives the high moisture control performance to the glazed material. The reason is considered as follows.

When the glazed body is fired to prepare the moisture control construction material, gases are generated from the body material and they penetrate the thin glaze layer to form, water-vapor-permeable minute holes to the glass layer.

An amount and specific gravity of the glaze to be applied to the body are selected to give the aforementioned "glazed-area proportion" or the "maximum thickness" to the glazed material.

For example, when the glaze is applied according to an ordinary "spraying method", the "glazed-area proportion" is restrained by reducing the amount of the glaze per unit area from exceeding 90%. When the glaze is applied on the entire surface of the construction material by the "cascade glazing method", the "maximum thickness" is reduced by decreasing the amount of glaze.

The glaze comprize frit. In case the glazed body is fired rapidly in a roller hearth kiln, the frit preferably has a softening point lower than the firing temperature by 100 to 400° C. The frit has a proper melt viscosity so that minute holes are formed in the glaze on the body.

The glaze may be applied on the body with a spot pattern, a linear pattern or a lattice pattern instead of a method of applying the glaze to the entire surface of the body. For instance, when the glaze is applied on the body by a printing method, glazed portions are arranged at regular intervals by meshes to reduce the "glazed-area portion. In the case of employing what is called a "centrifugal method", the glaze is applied in spots, so that the "glazed-area proportion" is reduced.

Slurry having a specific gravity of about 1.01 to 1.90, which is obtained by mixing a frit with water, may be employed as glaze to be used for glazing. The slurry may be added with clay and pigment. The decorativeness of the construction material is enhanced still more by the addition of pigment to the slurry.

A water repellent agent, such as a silicon-based emulsion, may be made to adhere to the rear surface of the moisture control construction material by roll-coating or spraying thereof so as to prevent moisture spreading from the glaze to the fabric-side portion (for example, a backing layer).

EXAMPLES AND COMPARATIBE EXAMPLES

Hereunder, the present invention will be more concretely described by citing examples and comparative examples.

First and Second Examples and First Comparative Example

Raw materials for the body are mixed at the following ratio and finely ground by a mill. Then, spray granulation is performed on the fine-ground raw materials. Subsequently, the compact body is produced by press-molding.

Compounding Recipe (in parts by weight) of Compact:
Kanumatsuchi: 20
Clay: 60
Vitric ingredients: 20

Then, slurry (having a specific gravidity of 1.2 g/cm$^3$) obtained by mixing an alkali-alumino-borosilicate frit (having a softening point of 570° C.) and water is sprayed onto the obtained compact body by a spray gun at the amount of glaze per unit area (1 m$^2$) shown in Table 1. Further, the glazed body is fired at a temperature of 800° C. by a roller hearth kiln.

The "glazed-area proportion", "maximum thickness", moisture control performance and moisture-absorbing-and-desorbing-performance in each 8-hour cycle of the obtained burnt product are determined by the following methods. Results are shown in TABLE 1. A pore distribution and moisture-absorbing-and-desorbing-performance in 24 hour cycle of the product are also determined by the below-described methods, and results are shown in FIGS. 2 and 3. Data of terraccota are also shown in FIGS. 2 and 3.

Method of Determining "Glazed-Area Proportion"

Fist, emulsion ink is applied to the surface of the fired product. Then, the surface thereof is quickly wiped with a piece of cloth soaked with water. Subsequently, a proportion between the area of a portion of the surface, from which the ink is removed, and that of the entire surface is obtained by microscopic observation or image processing.

Method of Determining the "Maximum Thickness"

A cutaway section of the product is observed by a microscope, thereby obtaining the "maximum thickness".

Method of Determining the "Moisture Control Performance"

First, in a steady-temperature-and-humidity chamber in which relative humidity is maintained at 50%, a test sample of the product is set so that the weight thereof is substantially constant (namely, a variation in weight thereof is less than 0.1%). Then, this test sample is quickly put into another steady-temperature-and-humidity chamber in which relative humidity is maintained at 90%. An increase in weight (namely, an amount of absorbed moisture in gram) thereof per unit area (1 m$^2$) is measured 8 hours later. Similarly, an increase in weight per unit area of another burnt product obtained by firing an unglazed compact is measured. The percentage of the measured increase in weight per unit area of the former burnt product to that in weight per unit area of the latter burnt product is obtained as the moisture control performance of the former burnt product.

Method of Determining the "Moisture-Absorbing-and-Desorbing-Performance in 8-Hour Cycle"

First, the amounts of moisture absorbed and desorbed during 8 hours are measured correspondingly to a change in a relative humidity between 50% and 90%, and then converted into values per unit area (1 m$^2$). Thus, the moisture-absorbing-and-desorbing-performance in an 8-hour cycle is obtained in the aforementioned way.

Method of Determining the "Moisture-Absorbing-and-Desorbing-Performance in 24-Hour Cycle"

The method is conducted in a same manner as the above method of determining the "Moisture-Absorbing-and-Desorbing-Performance in 8-Hour Cycle" except that the moisture-absorbing-and-desorbing-performance is continued up to 24 hours.

Method of Determining the Pore Distribution

It is determined by BET method.

Third and Fourth Examples and Second Comparative Example

In this case, a fired product is obtained similarly as in the case of first example, except that alkali-alumino-silicate frit (having a softening point of 700° C.) is employed instead of alkali-alumino-borosilicate frit used in the first example, and that slurry is glazed at the amount of glazed described in TABLE 1. Moreover, the "glazed-area proportion", "maximum thickness", moisture control performance and moisture-absorbing-and-desorbing-performance in an 8-hour cycle of the obtained burnt product are determined, similarly as in the case of First Embodiment. Results are shown in TABLE 1.

TABLE 1

| Examples | | frit (softening point) | amount of glaze applied (g/m²) | glazed-area proportion (%) | maximum thickness (μm) | moisture-control performance (%) | moisture-absorbing-and-desorbing-performance in 8-hour cycle (g/m²) |
|---|---|---|---|---|---|---|---|
| Example | 1 | alkali-alumino-borosilicate (570° C.) | 100 | 80 | 150 | 100 | 130 |
| | 2 | alkali-alumino-borosilicate (570° C.) | 150 | 90 | 270 | 80 | 104 |
| | 3 | alkali-aluminosilicate (700° C.) | 150 | 80 | 280 | 100 | 130 |
| | 4 | alkali-aluminosilicate (700° C.) | 200 | 90 | 330 | 85 | 111 |
| Comparative Example | 1 | alkali-alumino-borosilicate (570° C.) | 200 | 95 | 380 | 20 | 26 |
| | 2 | alkali-aluminosilicate (700° C.) | 250 | 95 | 430 | 30 | 39 |

TABLE 1 clearly shows the following facts. When the amount of used glaze increases, the "glazed-area proportion" also increases. In the case that the "glazed-area proportion" is 80%, the moisture control performance is not degraded. However, when the "glazed-area proportion" exceeds 80%, the moisture control performance and the moisture-absorbing-and-desorbing-performance are degraded. Conversely, when the "glazed-area proportion" is 90%, the moisture control performance of the glazed product is maintained at a level which is higher than that of the product obtained from an unglazed compact and which is not less than 80%. Moreover, the moisture-absorbing-and-desorbing-performance in each 8-hour cycle is not less than 80 g/m².

In contrast with this, in the case of these Comparative Examples in which the "glazed-area proportion" is set at 95%, the moisture control performance extremely decreases. Moreover, the moisture absorbing and desorbing performance in an 8-hour cycle is lower than 80 g/m².

Incidentally, in the case of the third and fourth examples and the second comparative example, the "glazed-area proportion" corresponding the amount of glaze is lower than that obtained in the case of the first and second examples and the first comparative example. The reason is considered as follows. Namely, as a result of using the frit having a high softening point, an amount of molten glaze is small. Therefore, the viscosity thereof is high.

In the case that a glass layer is produced on the surface of the moisture control construction material by glazing and burning this material, the moisture control performance and the moisture-absorbing-and-desorbing-performance in an 8-hour cycle are maintained at levels, which are not less than 80% and 80 g/m², respectively.

Fifth and Sixth Examples and Third Comparative Example

First, the compact body obtained in the process described in the description of the first embodiment is biscuit fired. Then, soda-lime glass (having a softening point of about 680° C.), clay and water are mixed. Subsequently, glaze slurry (having a specific gravity of 1.05) is obtained by fine-grinding of a resultant mixture. Thereafter, cascade-glazing is performed on the entire surface of the glaze slurry (thus, the "lazed-area proportion" is 100%) at the amount of glaze per unit-area (1 m²) described in TABLE 2 listed below. Then, a burnt product is obtained by performing glost-firing on the glazed slurry at a temperature of 680° C. by a roller hearth kiln. Similarly as in the case of the first example, the "maximum thickness", the moisture control performance and the moisture-absorbing-and-desorbing-performance in an 8-hour cycle are determined. Results are shown in TABLE 2.

TABLE 2

| Examples | amount of glaze applied (g/m²) | maximum thickness (μm) | moisture control performance (%) | moisture-absorbing and-desorbing-performance in 8-hour cycle (g/m²) |
|---|---|---|---|---|
| Example 5 | 50 | 80 | 100 | 120 |
| Example 6 | 150 | 300 | 80 | 96 |
| Comparative Example 3 | 200 | 400 | 15 | 18 |

It is seen from TABLE 2 that, when the thickness of the glass layer is small, the moisture control performance and moisture-absorbing-and-desorbing-performance of the construction material are not degraded, and that, if the "maximum thickness" is less than 300 μm, the moisture control performance and the moisture-absorbing-and-desorbing-performance in an 8-hour cycle are maintained at levels, which are more than 80% and 80 g/m², respectively.

Seventh Example and Fourth Comparative Example

First, the compact body obtained in the process described in the description of the first embodiment is mixed with alkali-alumino-borosilicate frit (having a softening point of about 670° C.), clay, pigment and water. Subsequently, glaze slurry (having a specific gravity of 1.60) is obtained by fine-grinding of a resultant mixture. Thereafter, the glaze slurry is glazed (or decorated) by the "printing method" through the use of a mesh screen, whose opening is 50%, at the amount of glaze per unit-area (1 m²) described in TABLE 3 listed below. Then, the glazed slurry is fired at a temperature of 900° C. by a roller hearth kiln. Similarly as in the case of the first example, the "glazed-area proportion", the "maximum thickness", the moisture control performance and the moisture-absorbing-and-desorbing-performance in each 8-hour cycle of the obtained burnt product are determined. Results are shown in TABLE 3.

Eighth Example and Fifth Comparative Example

In this case, a fired product is obtained similarly as in the case of seventh example, except that alkali-alumino-silicate frit (having a softening point of about 620° C.) is employed instead of alkali-alumino-borosilicate frit used in the first example, and that slurry is glazed by dripping it on the body at the amount of glazed described in TABLE 3, which is based on a centrifugal glazing through the use of a drum. Moreover, the "glazed-area proportion", "maximum thickness", moisture control performance and moisture-absorbing-and-desorbing-performance in each 8-hour cycle of the obtained burnt product are determined, similarly as in the case of First Embodiment. Results are shown in TABLE 3.

TABLE 3

| Examples | frit (softening point) | method of glaze applied | amount of glaze applied (g/m²) | glazed-area proportion (%) | maximum thickness (μm) | moisture control performance (%) | moisture-absorbing-and-desorbing-performance in 8-hour cycle (g/m²) |
|---|---|---|---|---|---|---|---|
| Example | | | | | | | |
| 7 | alkali-alumino-borosilicate (670° C.) | printing method | 250 | 85 | 250 | 80 | 104 |
| 8 | alkali-alumino-silicate (620° C.) | Centrifugal method | 300 | 90 | 300 | 85 | 111 |
| Comparative Example | | | | | | | |
| 4 | alkali-alumino-borosilicate (670° C.) | printing method | 300 | 95 | 350 | 25 | 33 |
| 5 | alkali-alumino-silicate (620° C.) | Centrifugal method | 400 | 95 | 400 | 40 | 52 |

It is seen from TABLE 3 that, even in the case that the printing method or the centrifugal method is employed as the glazing (or decorating) method, the moisture control performance and the moisture-absorbing-and-desorbing-performance in each 8-hour cycle are maintained at levels, which are more than 80% and 80 g/m², respectively.

As described above in detail, according to the present invention, there is provided a moisture control construction material of high commercial value, which is enhanced in decorativeness and improved in stain-resistance by glazing the surfaces thereof. The present invention prevents occurrences of condensation and growth of molds and mites in houses.

The present invention prevents the moisture control performance of a moisture control construction material from being impaired when the construction material is glazed. The moisture control construction material of the present invention achieves both of the maintenance of the moisture control performance and the improvement of the decorativeness and stain-resistance thereof.

What is claimed is:

1. A moisture control construction material having a body, comprising a burnt building material,
   wherein said body has a surface applied with glaze,
   said body has porosity of 20–50%, and
   more than 40% of pores of said body have a radius of less than 0.1 μm.

2. The moisture control construction material according to claim 1, wherein a glass layer produced from glaze is formed on a region of a surface of said body, and wherein said region has an area which is not more than 90% of the surface of said body.

3. The moisture control construction material according to claim 1, wherein a maximum thickness of a glass layer produced from glaze is less than 300 μm.

4. The moisture control construction material according to claim 1, wherein, after a surface of said moisture control construction material is glazed, a moisture control performance thereof is more than 80% of that thereof obtained before the surface thereof is glazed.

5. The moisture control construction material according to claim 1, wherein a moisture-absorbing-and-desorbing-performance in each 8-hour cycle thereof is more than 80 g/m².

6. The moisture control construction material according to claim 1, wherein a moisture-absorbing-and-desorbing-performance in each 8-hour cycle thereof is determined as follows: first, in a steady-temperature-and-humidity chamber in which a relative humidity is maintained at 50%, a first test sample is set so that a weight thereof is substantially constant (namely, a variation in weight thereof is not more than 0.1%); then, said first test sample is quickly put into another steady-temperature-and-humidity chamber in which relative humidity is maintained at 90%; an increase in weight (namely, an amount of absorbed moisture in gram) thereof, which is measured 8 hours later, is converted to a first value thereof per unit area (1 m²); said first value is determined as an amount of moisture absorbed during 8 hours;

meanwhile, an amount of moisture desorbed during 8 hours is obtained by first, in a steady-temperature-and-humidity chamber in which a relative humidity is maintained at 90%, a second test sample is set so that a weight thereof is substantially constant (namely, a variation in weight thereof is not more than 0.1%) and by subsequently, said second test sample is quickly put into another steady-temperature-and-humidity chamber in which a relative humidity is maintained at 50%; a decrease in weight (namely, an amount of desorbed moisture in gram) thereof, which is measured 8 hours later, is converted to a second value thereof per unit area (1 m$^2$); said second value is determined as an amount of moisture desorbed during 8 hours; and then, a moisture-absorbing-and-desorbing-performance thereof is obtained by the following equation:

(The moisture-absorbing-and-desorbing-performance in 8-hour cycle)={(the amount of moisture absorbed during 8 hours)+(the amount of moisture desorbed during 8 hours)}/2.

7. The moisture control construction material according to claim 1, wherein said body obtained before glazed is a burnt material.

8. The moisture control construction material according to claim 1, wherein said body obtained before glazed is an unburnt material.

9. The moisture control construction material according to claim 1, wherein said body is produced as follows: moisture control raw materials, such as volcanic pumice layer materials produced at various places and called "kanumatsuchi", "ohsawado", colloidal soil, watertight soil and "misotsuchi", diatomite, acid clay, active clay, zeolite, halloysite, sepiolite, allophane, and imogolite are mixed with clays, such as kibushi-clay and gairome-clay, and with vitric ingredients, such as siliceous stone, pottery stone, agalmatolite and feldspar; and then, said body is formed as a compact by performing extrusion molding or press molding on a resultant mixture.

10. The moisture control construction material according to claim 9, wherein said body is produced by firing the obtained compact.

11. The moisture control construction material according to claim 9, wherein a compounding recipe (in parts by weight) among the materials of said body is as follows:

Moisture control raw materials such as kanumatsuchi: 100

Clay: 100 to 1000

Vitric Ingredients: 0 to 500.

12. The moisture control construction material according to claim 10, wherein a compounding recipe (in parts by weight) among the materials of said body is as follows:

Moisture control raw materials such as kanumatsuchi: 100

Clay: 100 to 1000

Vitric Ingredients: 0 to 500.

13. The moisture control construction material according to claim 1, wherein grooves are formed in a back surface portion thereof.

14. The moisture control construction material according to claim 1, wherein a surface of said body is glazed so that at least one of the following conditions (a) and (b) is met:

(a) A ratio of the area of a glass layer, which is produced from glaze, to the area of the entire surface of said body of the moisture control construction material is not more than 90%; and (b) A maximum thickness of said glass layer produced from glaze is not more than 300 µm.

* * * * *